(12) United States Patent
Hjaltason et al.

(10) Patent No.: US 6,789,502 B2
(45) Date of Patent: Sep. 14, 2004

(54) CULTIVATION OF DHA-RICH PREY ORGANISMS FOR AQUATIC SPECIES

(76) Inventors: Baldur Hjaltason, Haaleitisbraut 93, 108 Reykjavik (IS); Gudmundur G. Haraldsson, Klyfjaseli 14, 109 Reykjavik (IS); Olafur Halldorsson, Hjallalundi 12, 600 Akureyri (IS)

( * ) Notice: Subject to any disclaimer, the term of this patent is extended or adjusted under 35 U.S.C. 154(b) by 0 days.

(21) Appl. No.: 10/181,225

(22) PCT Filed: Jan. 15, 2001

(86) PCT No.: PCT/IS01/00002

§ 371 (c)(1),
(2), (4) Date: Jul. 15, 2002

(87) PCT Pub. No.: WO01/50880

PCT Pub. Date: Jul. 19, 2001

(65) Prior Publication Data

US 2003/0097993 A1 May 29, 2003

(30) Foreign Application Priority Data

Jan. 14, 2000 (IS) .................................................. 5347

(51) Int. Cl.⁷ .............................................. A01K 61/00
(52) U.S. Cl. ..................... 119/51.04; 119/230; 119/242
(58) Field of Search ................................ 119/212, 230, 119/242, 51.04

(56) References Cited

U.S. PATENT DOCUMENTS

| | | | | |
|---|---|---|---|---|
| 4,593,647 A | * | 6/1986 | Sorgeloos et al. | 119/205 |
| 4,906,479 A | | 3/1990 | Kitagawa et al. | |
| 5,132,120 A | * | 7/1992 | Salte et al. | 426/2 |
| 5,492,938 A | * | 2/1996 | Kyle et al. | 514/786 |
| 5,656,319 A | * | 8/1997 | Barclay | 426/574 |
| 5,698,246 A | * | 12/1997 | Villamar | 426/54 |
| 5,711,983 A | * | 1/1998 | Kyle et al. | 426/635 |
| 5,746,155 A | * | 5/1998 | Logan et al. | 119/230 |
| 6,372,460 B1 | * | 4/2002 | Gladue et al. | 435/134 |
| 6,399,118 B1 | * | 6/2002 | Zemach et al. | 426/2 |
| 6,582,941 B1 | * | 6/2003 | Yokochi et al. | 435/134 |

FOREIGN PATENT DOCUMENTS

| | | |
|---|---|---|
| WO | 96/17526 | 6/1996 |
| WO | 99/06585 | 2/1999 |
| WO | 99/37166 | 7/1999 |

OTHER PUBLICATIONS

U.S. patent application Ser. No. 10/181,226, Hjaltason et al., filed Jul. 3, 2003.

U.S. patent application Ser. No. 10/181,227, Hjaltason et al., filed Jan. 23, 2003.

L. A. McEvoy et al., "Lipid and fatty acid composition of normal and malpigmented Atlantic halibut(*Hippoglossus hippoglossus*) fed enriched Artemia: a comparison with fry fed wild copepods," Aquaculture 163 (1998), pp. 237–250.

J. C. Navarro et al., "Effects of two Artemia diets with different contents of polyunsaturated fatty acids on the lipid composition of larvae of Atlantic herring (*Clupea harengus*)," Journal of Fish Biology (1993) 43, pp. 503–515.

John Sargent et al., "Lipid nutrition of marine fish during early development: current status and future directions," Aquaculture 179 (1999), pp. 217–229.

Douglas R. Tocher et al., "The use of silages prepared from fish neural tissues as enrichers for rotifers (*Brachionus plicatilis*) and Artemia in the nutrition of larval marine fish," Aquaculture 148 (1997), pp. 213–231 1 page abstract; accession No. 00576751.

G. Mourente et al., "The effects of weaning onto a dry pellet diet on brain lipid and fatty acid compositions in post–larval gilthead sea bream (*Sparus aurata* L.)," Aquatic Sci. & Fish Abs., pp. 605–611 (1993) accession No. 00436265, 1 page Abstract.

J. W. Tucker, "Feeding intensively–reared marine fish larvae," Aquatic Sci. & Fish Abs., pp. 129–146 (1992), accession No. 00507558, 1 page.

Patent abstract of Japan, JP 03277241, Dec. 9, 1991, vol. 16, No. 93.

Patent abstract of Japan, JP 03277242, Dec. 9, 1991, vol. 16, No. 93.

Database WPI, Section Ch. Week 199404, Derwent Publications Ltd., London, GB; AN 1994–010938, XP002901677 & JP 05 316958 A (Riken Vitamin Co.), Dec. 3, 1993, abstract.

Patent Abstract of Japan vol. 018, No. 131 (C–1175), Mar. 3, 1994 & JP 05 316958 (Riken Vitamin Co. Ltd.), Dec. 3, 1993, English abstract.

Patent Abstract of Japan, vol. 1996, No. 08, Aug. 30, 1996 & JP 08 098659 A (Nippon Suisan Kaisha Ltd.), Apr. 16, 1996, English abstract.

Patent Abstracts of Japan, vol. 1997, No. 09, Sep. 30, 1997 & JP 09 121784 (Nippon Suisan Kaisha Ltd.), May 13, 1997, abstract.

L. A. McEvoy et al., "Lipid and fatty acid composition of normal and malpigmented Atlantic halibut (*Hippoglossus hippoglossus*) fed enriched Artemia: a comparison with fry fed wild copepods," Aquaculture 163 (1998), pp. 237–250.

(List continued on next page.)

*Primary Examiner*—Son T. Nguyen
(74) *Attorney, Agent, or Firm*—Hunton & Williams LLP

(57) ABSTRACT

A method is provided for producing prey organisms such as Artemia and rotifers, for feeding aquacultural organisms in particular at the larval stage. The method comprises cultivating the prey organisms during at least part of their life cycle in an aqueous medium comprising at least one lipid component having a DHA content of at least 30 wt %. The enriched prey organisms preferably have a DHA content of at least 12 wt % of their total lipid content. The prey organisms are suitable feed for larvae of fish including halibut, turbot, bass, and flounder, and crustaceans and molluscs.

40 Claims, No Drawings

OTHER PUBLICATIONS

J. C. Navarro et al., "Effects of two Artemia diets with different contents of polyunsaturated fatty acids on the lipid composition of larvae of Atlantic herring (*Clupea harengus*)," Journal of Fish Biology (1993) 43, pp. 503–515.

John Sargent et al., "Lipid nutrition of marine fish during early development: current status and future directions," Aquaculture 179 (1999), pp. 217–229.

Douglas R. Tocher et al., "The use of silages prepared from fish neural tissues as enriches for rotifers (*Brachionus plicatilis*) and Artemia in the nutrition of larval marine fish," Aquaculture 148 (1997), pp. 213–231, 1 page abstract accession No. 00576751.

G. Mourente et al., "The effects of weaning onto a dry pellet diet on brain lipid and fatty acid compositions in post–larval gilthead sea bream (*Sparus aurata* L.)," Aquatic Sci. & Fish Abs., pp. 605–611 (1993) accession No. 00436265, 1 page abstract.

J. W. Tucker, "Feeding intensively–reared marine fish larvae," Aquatic Sci. & Fish Abs., pp. 129–146 (1992), accession No. 00507558, 1 page.

Patent Abstract of Japan, vol. 016, No. 093 (C–0917), Mar. 6, 1992 & JP 03 277241 (Higashimaru:KK), Dec. 9, 1991, abstract.

Patent abstract of Japan, vol. 1997, No. 09, Sep. 30, 1997 & JP 09 121784 A (Nippon Suisan Kaisha Ltd.), May 13, 1997, abstract.

Patent Abstract of Japan, vol. 016, No. 093 (C–0917), Mar. 6, 1992 & JP 03 277242 (Higashimaru: KK), Dec. 9, 1991, abstract.

* cited by examiner

CULTIVATION OF DHA-RICH PREY ORGANISMS FOR AQUATIC SPECIES

FIELD OF THE INVENTION

The present invention is within the field of aquaculture, in particular there is provided a method for producing prey organisms enriched in highly unsaturated fatty acids (HUFAs), particularly docosahexaenoic acid (DHA). Also provided are feed compositions based on such organisms.

TECHNICAL BACKGROUND AND PRIOR ART

The consumption of seafood species for which there is a high consumer demand such as salmon, trout, halibut and eel is increasing and due to this high demand and limited natural stocks, much effort is spent on developing cost effective aquacultural methods of farming such species. A particularly serious problem is to secure a high survival rate of the hatched larvae of the species being cultivated.

Expansion of the aquaculture industry requires that several problems be addressed, one of the most significant being the difficulty of supplying live prey organisms which provide a nutritionally adequate feed for the larvae. Larval fish in the wild consume a mixed population of phytoplankton prey organisms that provide a balanced nutrition. However, collecting phytoplankton in sufficient quantities to meet the demand in aquaculture is not feasible. As an alternative, selected species of prey organisms, in particular rotifers and Artemia species, are presently cultivated and used as feed.

Generally however, such artificially cultivated prey organisms, although they provide adequate amounts of protein and energy, have a lipid composition which is not adequate to cover the requirement for certain HUFAs, in particular DHA and EPA which are essential for the optimum survival, growth and development of larvae. Specifically, it has been shown that a high content of DHA is required and that the ratio between DHA and EPA in the prey organisms should be at least 1:1 and preferably at least 2:1. To provide prey organisms having such a composition in respect of HUFAs it is necessary to cultivate the organisms in the presence of enrichment compositions having a high content of DHA, preferably at least 20 wt % and a ratio of DHA to EPA exceeding the ratio aimed at in the prey organisms, such as at least 3:1 and preferably higher.

Currently, this problem is being addressed by cultivating the prey organisms in the presence of enrichment compositions permitting the organisms to be enriched in respect of these essential fatty acids. However, presently available commercial compositions for that purpose such as emulsion products sold under the tradename Selco (TM) do not meet the above requirements in that the DHA content is relatively low and/or the DHA:EPA ratio is not high enough. Using such compositions Artemia enrichment levels of 3–5% DHA of total lipids have been reported (McEvoy et al. Aquaculture 163 (1998) 237–250), and 12 to 15% survival rates of fish fed such Artemia (McEvoy et al. supra; Navarro et al. J. Fish Biol. 43 (1993) 503–515). In this context, survival rates are defined as survival percentage from the first feeding through metamorphosis. For cost-effective aquaculture production a larval survival rate of 50% and preferably higher should be obtained.

Other commercially available compositions for prey organism enrichment are products sold under the tradename Algamac (TM) containing up to 14 wt % of DHA, and tuna orbital oil (TOO) that contains up to 30 wt % of DHA.

WO 99/37166 discloses a method for the enrichment of live prey organisms with nutrients essential for fish larvae based on the use of dry soap powders of HUFAs obtained from the waste stream of marine algae oil extraction. The raw material for providing these powders has a content of phospholipids and it contains about 23 wt % of DHA, but apparently very little of other n-3 fatty acids. Artemia DHA enrichment levels of about 2.7% of dry weight are disclosed, but the use in aquaculture and efficacy with respect to predator larvae survival is not disclosed.

Another material intended for use in aquaculture is described in WO 99/06585. Examples disclose a DHA content of 24 wt %, but the phospholipid content is not disclosed. The material however, contains a high proportion of free fatty acids (about 32–37 wt %) and a high content of non-lipid material (about 39–44 wt %), which may reduce the lipid uptake efficiency of prey animals. A high content of free fatty acids is generally considered harmful for fish larvae and juveniles.

Neither of the two last-mentioned materials is fish-based and they lack many HUFAs found in fish, such as EPA and other n-3 fatty acids.

In a recent review by Sargent et al. (Aquaculture 179 (1999) 217–229) it is emphasized that in addition to the requirement in respect of HUFAs, fish larvae have a dietary requirement for phospholipids and it is stressed that the ideal diet for fish larvae is a diet having a composition similar to the yolk of the eggs. According to these authors fish egg yolk contains about 10 wt % (on a dry matter basis) phospholipids which contain about 17 wt % of DHA and about 9 wt % of EPA. These authors conclude in their review that a problem remains with respect to how to construct such a diet on a commercial scale from currently available materials.

It has now been found that it is possible to provide—on a commercial scale—enriched aquacultural prey organisms having, in respect of HUFAs and phospholipids, a composition which is very close to that of fish egg yolk. By using the prey organisms of the invention it is possible to secure optimum survival, growth, pigmentation and morphogenesis of fish larvae such as halibut larvae. As demonstrated herein, the invention provides much higher survival rates during the larval stage and increased quality parameters than previously disclosed for fish such as Halibut, thus making aquacultural rearing of many high-demand fish species more economical and commercially viable.

SUMMARY OF THE INVENTION

In a first aspect, the invention provides a method of producing prey organisms for use in aquaculture, in particular for feeding larval fish, the method comprising cultivating said organisms during at least part of their life cycle in an aqueous medium comprising at least one lipid component having a DHA content of at least 30 wt %.

In a further aspect, the invention provides a composition for feeding fish in the larval and/or non-larval stage, the composition comprising the above mentioned prey organisms; said organisms having a content of DHA of at least 12 wt % of the total lipid content of the organisms.

In yet a further aspect, the invention provides a method of producing a composition having a water content that is less than 50 wt % including having a water content less than 10 wt % comprising producing live organisms according to the aforementioned method and at least partially separating the cultivated organisms from the aqueous medium.

In still a further aspect, the invention provides the use of the above compositions for feeding aquatic organisms at the larval and/or post-larval stage.

DETAILED DESCRIPTION OF INVENTION

The method according to the invention, of producing prey organisms for use in aquaculture, in particular for feeding larval fish, comprises cultivating said organisms during at least part of their life cycle in an aqueous medium comprising at least one lipid component having a DHA content of at least 30 wt %.

In the present context, the expression 'prey organisms' refers to any marine organism which can be used as live feed for larvae of marine species which are produced in aquacultural facilities. A general review of such prey organisms can be found in Lavens & Sorgeloos (eds.) "Manual on the production and use of live food for aquaculture" published by FAO (1995) which is hereby incorporated by reference. Accordingly, the most commonly used prey organisms include several classes and genera of microalgae, rotifers, Artemia, zooplankton including copepods, cladocerans, nematodes, and trochophora larvae.

As used herein, the term 'aquaculture' is to be understood in its broadest sense and it includes any production of any aquatic species produced under aquacultural conditions, such as fish species, including as examples salmon, trout, carp, bass, bream, turbot, sea bass, sole, milkfish, gray mullet, grouper, sea bream, halibut, flounder, Japanese flounder, monkfish; crustaceans such as shrimp, lobster, crayfish and crabs; molluscs such as bivalves.

A common feature of these aquatic species is that the life cycle includes one or more larval stages which may have very specific nutritional requirements and accordingly the provision of live prey organisms meeting this requirement is an essential factor for successful aquacultural production. As mentioned above, one such specific requirement is a high content of the essential fatty acid DHA, the term 'essential' implying that the prey organisms are not capable of de novo synthesis of such compounds.

In a useful embodiment of the method, cultivation of the prey organisms is carried out until in at least 50% of the cultivated organisms the DHA content of their total lipid content is 12 wt % or higher. Preferably the DHA content in the total lipid content of cultivated organisms is at least 15 wt %, including at least 17.5 wt %, such as at least 20 wt %, including at least 25 wt %.

The current invention allows such prey animal cultivation on a large economical scale, to provide suitable feed for successful commercial cultivation of fish species such as e.g. halibut, that are particularly sensitive during their larval stage and have proven very difficult to raise successfully in aquaculture with state of the art methods.

According to the method, the prey organisms to be cultivated may be selected from any prey organisms that can be raised and used in aquaculture, in useful embodiments the organisms are of a crustacean species such as Artemia, Copepoda, Daphnia, or Moina species; a Rotifera species including *Brachionus plicatilis, Brachionus rotundiformis,* and *Brachionus rubens;* or a Brachiopoda species.

The embodiments involving Artemia species are particularly useful. The Artemia species can be cultivated and used according to the method of the invention at a naupliar, metanaupliar, or adult stage.

In specific embodiments of the method, the lipid component used is a component essentially comprising triglycerides or a phospholipid-rich component. As stated above, phospholipids are, in addition to DHA content, a critical ingredient for successful aquaculture rearing of many species. Therefore, in a useful embodiment of the method, the aqueous medium in which the organisms are cultivated comprises a lipid-containing composition comprising a phospholipid-rich component comprising at least 25 wt %, such as e.g. at least 40 wt % of phospholipids, preferably at least 50 wt % of phospholipids such as at least 60 wt %, or at least 70 wt % phospholipids; the composition having a DHA content of at least 30 wt %.

In the present context the term 'phospholipids' is used to describe a class of lipids containing phosphoric acid as a mono- or diester. Thus, phospholipids include phosphatidyl choline (PC), phosphatidyl ethanolamine (PE), phosphatidyl inositol (PI), phosphatidyl glycerol (PG), phosphatidyl serine (PS), and phosphatidic acid (PA). The term 'lecithin' is also commonly used for mixtures of the above phospholipids.

In accordance with the invention any phospholipid-rich component can be used in the composition of the method. However, presently preferred phospholipids are phospholipids isolated from marine organism materials, including fresh materials and dried materials. Fresh materials include for example viscera from fish and other marine animals, flesh of fish, fish eggs, squids, molluscs and a planktonic biomass. Dried materials include, in particular, fishmeals such as meals of herring, capelin, mackerel, menhaden, sardine, anchovy, horse mackerel, blue whiting, and meals of planktonic organisms.

Such fish-based materials are particularly preferred according to the invention, as they provide not only a high content of DHA but they also contain EPA and other n-3 PUFAs, characteristic of fish, including 18:3, 18:4, 20:4 and 22:5, and are to an extent similar to the natural diet of fish larvae.

In useful embodiments, the phospholipid-rich component provides the required amount of DHA. However, in other embodiments the DHA content of the phospholipid component may not be sufficient. In such cases, at least one further lipid component that provides an adequate amount of DHA must be incorporated. Typically, such a further lipid component contains at least 20 wt % of DHA, preferably at least 30 wt % of DHA, more preferably at least 40 wt % of DHA, for example at least 50 wt % of DHA. In preferred embodiments, the further lipid component includes at least 60 wt % of DHA, such as at least 70 wt % DHA, including at least 90 wt % DHA.

If required, the further DHA-rich lipid component is incorporated in the composition of the invention in an amount that at least results in a total DHA content of the composition which is at least 30 wt %. Depending on the DHA content of the phospholipid-rich component, the amount of the further lipid component required may be in the range of 5–99 wt %. In certain embodiments of the invention the amount of the further lipid component is in the range of 50–95 wt %, such as in the range of 50–70 wt %, or higher.

In cases where it is required to supplement the phospholipid-rich component to enhance the level of DHA, the proportion of that component may vary in the range of about 1–99%, such as in the range of 2–75 wt % including the range of 5–50 wt %, such as 5–25 wt %, including the range of about 10–20 wt %.

The source of the further lipid component may be any naturally occurring lipids containing at least 20 wt % of DHA and any such lipids synthesized chemically or enzymatically. In useful embodiments the further lipid component comprises essentially glycerides such as triglycerides. Such a component with a high content of DHA ca be provided as a triglyceride by contacting DHA as a free fatty acid and glycerol in the presence of chemical catalysts or an enzyme capable of forming glycerides from the reactants, such as a lipase including a lipase isolated from *Candida*

*antarctica*. Free fatty acids though are generally not recommended as a major component in feed compositions for fish prey organisms, as it is generally considered in the state of the art, that a high free fatty acid content may be harmful for fish juveniles. In preferred embodiments of the method of the invention, the lipid-containing compositions for feeding prey-animals contain less than about 10 wt % free fatty acids, and preferanly less than about 5 wt %, such as less than about 2 wt %. In certain embodiments, fish-based sources are used for obtaining the further lipid component for the reasons mentioned above, i.e. that such materials additionally provide other desired n-3 HUFAs.

As mentioned above, it has been shown that not only a high content of DHA is required in the feed for fish larvae, but the ratio between DHA and EPA in the prey organisms is of significance for the survival and development of the larvae of the cultured species. It is generally recognized that the DHA:EPA ratio in the prey organisms should be at least 1:1 and preferably at least 2:1. In order to achieve this desired ratio in the prey organisms, a significantly higher ratio may be required in the enrichment composition for the prey organism. Thus, according to the method of the invention the lipid-containing composition has in preferred embodiments a DHA:EPA weight ratio in the range of 1:1 to 10:1, more preferably 2:1 to 8:1, including the range of 4:1 to 6:1.

As can be understood based on the above, a high total content of DHA in the feeding composition of the method is of significance to achieve the desired results of the invention, such as at least 30 wt %, preferably at least 35 wt %, including at least 40 wt %, and more preferably at least 50 wt % including at least 60 wt %, such as at least 70 wt %.

The concentration of the lipid component or the lipid composition in the aqueous medium of the method may be any useful concentration that provides effective feeding and thus enrichment of the prey organism. In useful embodiments this amounts to a concentration in the range of 0.01–5 g/L of the lipid component or the lipid composition, including the range of 0.01–1 g, such as the range of 0.01–0.1 g/L.

In a preferred embodiment, the lipid component or lipid composition is in the form of an emulsion in the aqueous medium, such as in the form of micellar particles of size that allows for ingestion by the prey organisms, e.g., such that the average largest dimension is in the range of 1–100 $\mu$m, including the range of 1–50 $\mu$m.

In certain useful embodiments the aqueous medium is sea water or simulates sea water, with the addition of, e.g., sodium chloride.

In a further aspect, the present invention provides a composition for feeding marine organisms at the larval and/or non-larval stage, the composition comprising prey organism having a content of DHA of at least 12 wt % of the total lipid content of the organisms, preferably 15 wt % of the total lipid content, more preferably 20 wt % of the total lipid content, including at least 25 wt % such as at least 30 wt % and also including at least 35 wt % of the total lipid content. The organisms may be any useful prey organisms that can be raised in aquaculture, including Crustacea species such as Artemia, Copepoda, Daphnia, and Moina; Rotifera species including *Brachionus plichatilis*; Brachiopoda species and Nematoda species.

As can be inferred from the above, in order for the composition to provide a significant DHA ration the total lipid content in the prey organisms needs to be significant, such as, e.g., at least 20 wt % on a dry matter basis, and preferably at least 30 wt % of dry matter. As mentioned, a high content of free fatty acids is not desirable in feed for fish larvae and other aquacultivated organisms. Preferably, free fatty acids are less than about 10 wt % of total lipid of the prey organisms according to the method of the invention.

In a particular embodiment, the composition comprises an aqueous phase of at least 50 wt % which may comprise a salt such as sodium chloride, in a concentration such as at the least 0.5 wt %. The composition can also be in a dry or semi-dry form such as less than 50 wt % of water, including less than 10 wt % of water, such as less than 1 wt % of water, such as essentially containing no water. The dry or semi-dry composition can be provided in the form of a powder, as granules, or as flakes.

Compositions comprising Artemia have been found to be particularly useful. The Artemia can be at a naupliar, metanauplii, or adult stage.

In yet a further aspect, the invention provides a method of producing a composition as described above comprising at least partially separating cultivated prey organisms as listed earlier from the aqueous medium in which they are cultivated. Particular embodiments of the method comprise the step of drying the separated organisms to obtain the composition in a form as described above.

In a still further aspect, the invention provides the use of a composition as described above for feeding aquatic organisms at the larval and/or post-larval stage. The aquatic organisms can be any species that can be cultivated aquaculturally, including salmon, trout, carp, bass, bream, turbot, sole, milkfish, gray mullet, grouper, flounder, sea bass, sea bream, cod, haddock, Japanese flounder, eel; crustaceans such as shrimp, lobster, crayfish and crabs; molluscs such as bivalves.

In certain embodiments, the invention provides the use of a composition for feeding aquatic organisms raised not primarily for consumption, such as ornamental fish species and aquarium fish species.

EXAMPLE 1

Large Scale Isolation of a Phospholipid-Rich Lipid Component from Squid Mantles

Minced squid (150 kg) was added to 300 L of isopropanol and the mixture was agitated rather vigorously for 4–6 h and left to stand overnight. Subsequently, the mixture was filtered and 300 L of hexane were added to the filtrate and mixed. This resulted in two phases which were allowed to separate. The upper phase, which largely consisted of hexane and isopropanol was separated and subjected to distillation in several rounds in vacuum using a 50 L rotary evaporator to yield a total of 2.2 kg of a phospholipid enriched fraction as a brown-yellowish wax having a phospholipid content of about 65 wt % and the following total fatty acid composition (numbers in left-most column refer to the number of carbons and double bond in the fatty acids of the lipid components, DHA is 22:6 and EPA 20:5):

| | |
|---|---|
| 14:0 | 1.9 |
| 16:0 | 28.3 |
| 16:1 | 0.6 |
| 18:0 | 2.9 |
| 18:1 | 3.2 |
| 18:2 | 0.2 |
| 18:3 | 0.0 |
| 18:4 | 0.2 |
| 20:1 | 2.7 |

-continued

| | |
|---|---|
| 20:4 | 1.4 |
| 20:5 | 13.8 |
| 21:5 | 0.0 |
| 22:1 | 0.0 |
| 22:6 | 40.4 |
| | 95.5 |

EXAMPLE 2
Preparation of an Enrichment Composition for Fish Larvae Prey Organisms A composition for prey organisms such as Artemia species was prepared by combining and mixing the following ingredients:

TABLE 2.1

| | |
|---|---|
| phospholipid-rich component from squid mantles (Example 1) | 9.7 g |
| TG 4010 (TM), Croda, essentially triglycerides w/≈ 40 wt % DHA | 78.0 g |
| vitamin C (ascorbyl palmitate) | 8.5 g |
| co-emulsifer, BASF Chremophore A25 (TM) | 1.6 g |
| Glucan Macroguard (TM) (immunostimulant) | 0.8 g |
| vitamin A (vitamin A palmitate, 1 mill i.u./g) | 0.190 g |
| vitamin E (DL-alpha tocopherol acetate) | 0.155 g |
| vitamin B (thiamine hydrochloride) | 1.2 g |
| TBHQ (antioxidant) | 0.036 g |
| Ethoxyquin (antioxidant) | 0.036 g |
| Total | 100 g |

The TG 4010 material used as a DHA-rich component in the composition is derived from fish oil-based material which is enriched for DHA, it comprises 40 wt % DHA, about 10 wt % EPA and about 10 wt % other n-3 HUFAs. The fatty acids are mostly in the form of triglycerides and the material has a very low free fatty acid content. Other materials have been tested as sources of a DHA-rich component, such as TG 5010 (also from Croda) which has a DHA content of about 50 wt %, and enzymatically highly DHA-enriched triglycerides.

EXAMPLE 3
Use of Enrichment Composition for Cultivating Artemia

Artemia cysts were hatched under optimal conditions (in seawater, 27–29° C., pH about 8, oxygen content above 4 mg/L). The newly hatched naupliar Artemia were rinsed and transferred in 250 L tanks to give a density of 200.000/L. Temperature was kept at 25–28° C., oxygen content at 5–6 mg/L and pH buffered at 7.5 with sodium bicarbonate (2 g/L). The tanks were aerated by passing atmospheric air through perforated hoses at bottom of tanks. Enrichment composition as described in Example 4 was added to the tanks to a concentration of 0.2 g/L and the same amount added 10 h later. 24 h after the first addition of enrichment composition the Artemia has the following lipid composition (31% dw (dry weight) lipids):

| | PL | TG | FFA | Total |
|---|---|---|---|---|
| | 16% | 76% | 8% | 100% |
| 14:0 | 8.8 | 1.0 | 3.1 | 0.8 |
| 16:0 | 15.0 | 8.8 | 36.0 | 11.1 |
| 16:1 | 2.6 | 3.2 | 3.1 | 2.5 |
| 18:0 | 6.4 | 2.7 | 6.3 | 4.2 |
| 18:1 | 25.2 | 15.6 | 13.0 | 17.1 |

-continued

| | PL | TG | FFA | Total |
|---|---|---|---|---|
| | 16% | 76% | 8% | 100% |
| 18:2 | 4.2 | 3.5 | 1.8 | 3.3 |
| 18:3 | 13.2 | 19.2 | 6.5 | 14.7 |
| 18:4 | 2.2 | 3.1 | 1.7 | 2.4 |
| 20:1 | 1.6 | 1.0 | 0.0 | 0.9 |
| 20:4 | 2.8 | 2.1 | 0.0 | 2.2 |
| 20:5 | 12.5 | 10.2 | 4.4 | 9.5 |
| 22:1 | 0.0 | 0.0 | 0.0 | |
| 22:4 | 0.0 | 1.1 | 0.0 | 1.2 |
| 22:5 | 0.0 | 1.0 | 0.0 | 1.1 |
| 22:6 | 4.6 | 20.0 | 14.8 | 18.9 |
| | 99.0 | 92.5 | 90.7 | 90.0 |

The Artemia thus obtained has a highly enriched total concentration of DHA in accordance with the invention and is thus particularly suitable for feeding fish larvae such as halibut larvae.

EXAMPLE 4

Use of Enrichment Composition for Cultivating Artemia

Newly hatched Artemia were placed in 250 L tanks and same conditions as described in Example 3. The Artemia were fed a lipid composition mixed 2 wt % Chremophore A25 emulsifier. The lipid composition contained 50 wt % phospholipid composition of Example 1; 25 wt % 'DHA-80', essentially triglycerides comprising 80 wt % DHA, synthesized enzymatically from glycerol and DHA fatty acid using lipase from Candida Antarctica (as described in U.S. Pat. No. 5,604,119); and 25 wt % Lysi-22 (TM) (Lysi hf, Iceland), a fish oil with 22 wt % DHA. The feed composition was added to the tanks to a concentration of 0.2 g/L and the same amount added 12 h later. 24 h after the first addition of enrichment composition the Artemia has the following lipid composition (34% dw lipids):

| | PL | TG | FFA | Total |
|---|---|---|---|---|
| | 25% | 72% | 3% | 100% |
| 14:0 | 0.9 | 1.1 | 0.0 | 1.3 |
| 16:0 | 13.6 | 10.6 | 32.0 | 11.2 |
| 16:1 | 3.3 | 3.5 | 3.3 | 3.4 |
| 18:0 | 5.8 | 2.2 | 10.6 | 3.3 |
| 18:1 | 26.2 | 15.4 | 15.7 | 15.1 |
| 18:2 | 3.7 | 2.7 | 0.0 | 2.5 |
| 18:3 | 13.8 | 15.0 | 4.4 | 13.7 |
| 18:4 | 2.7 | 2.1 | 0.0 | 2.2 |
| 20:1 | 1.0 | 1.9 | 5.3 | 2.0 |
| 20:4 | 2.1 | 1.7 | 0.0 | 1.9 |
| 20:5 | 13.1 | 8.7 | 5.0 | 9.7 |
| 22:6 | 8.4 | 28.8 | 23.6 | 28.0 |
| | 94.6 | 93.7 | 100.0 | 94.1 |

The Artemia obtained has a very highly enriched total concentration of DHA (9.5 wt %) in accordance with the invention as well as other fish-characteristic n-3 HUFAs, and is thus particularly suitable for feeding fish larvae such as halibut larvae.

EXAMPLE 5
Use of Enrichment Composition for Cultivating Rotifers (*Brachionus plichatilis*)

Rotifers were reared under similar conditions as described in Example 3, they were fed with Isochrysis plankton and yeast and enriched for 6 h at 27 C with an enrichment composition as described in Example 2, except that Croda 50 was used instead of Croda 40, Croda 50 containing about 50 wt % of DHA. The rotifers had the following lipid composition (22% dw lipids):

|      | PL<br>32% | TG<br>56% | FFA<br>13% | Total<br>100% |
|------|-----|-----|------|------|
| 14:0 | 6.6 | 7.8 | 3.3  | 6.9  |
| 16:0 | 25.9| 4.9 | 15.2 | 13.0 |
| 16:1 | 1.9 | 2.5 | 1.3  | 2.2  |
| 18:0 | 3.6 | 5.7 | 2.7  | 4.7  |
| 18:1 | 4.5 | 4.5 | 5.5  | 4.7  |
| 18:2 | 4.9 | 0.3 | 2.0  | 2.0  |
| 18:3 | 3.1 | 3.2 | 1.9  | 3.0  |
| 18:4 | 2.2 | 6.2 | 2.2  | 4.4  |
| 20:1 | 1.2 | 1.9 | 1.5  | 1.6  |
| 20:4 | 5.0 | 2.3 | 2.2  | 3.2  |
| 20:5 | 10.1| 14.7| 14.8 | 13.4 |
| 22:6 | 25.6| 38.8| 40.4 | 35.2 |
|      | 94.7| 92.7| 93.0 | 94.3 |

The rotifers obtained have a very high total concentration of DHA, distributed in the different lipid classes analyzed and thus exemplifies the efficacy of the invention.

EXAMPLE 6
Comparison of Enrichment Compositions for Cultivating Artemia

Artemia cysts hatched as in Example 3 and transfer to cultivation tanks where conditions were kept as in Example 3 (except for some difference in temperature, see table). Enrichment compositions were prepared similar as described in Example 2, i.e. with same additives added as in Table 2.1 such as emulsifier, vitamins and also about 10% of the phospholipid-rich component from squid mantles as described in Example 1. The bulk ingredient (about 80%) of the preparations were commercial lipid compositions as listed in Table x. These are AlgaMac 2000 (TM), DHA Selco (TM), DC DHA (TM) and feed grade Cod Liver Oil (from Lysi, Iceland) The preparations were added to the tanks to a concentration of 0.2 g/L and the same amount added 10 h later. 24 h after the first addition of enrichment composition the Artemia has the following lipid composition:

| T during growth<br>% dw lipids | AlgaMac 2000<br>20° C.<br>17% | DHA Selco<br>27° C.<br>24% | DC DHA<br>27° C.<br>22% | Cod liver oil<br>20° C.<br>23% | composition<br>from Ex. 2<br>27° C.<br>31% |
|------|------|------|------|------|------|
| 14:0 | 2.3  | 3.4  | 1.1  | 3.2  | 0.8  |
| 16:0 | 12.6 | 13.5 | 10.9 | 16.0 | 11.1 |
| 16:1 | 4.4  | 4.6  | 3.7  | 6.2  | 2.5  |
| 18:0 | 4.7  | 5.5  | 4.6  | 4.5  | 4.2  |
| 18:1 | 19.2 | 24.8 | 34.5 | 25.8 | 17.1 |
| 18:2 | 3.6  | 5.6  | 6.9  | 4.4  | 3.3  |
| 18:3 | 23.1 | 28.4 | 17.9 | 21.1 | 14.7 |
| 18:4 | 3.9  | 4.8  | 2.8  | 4.3  | 2.4  |
| 20:1 | 0.4  |      | 0.9  | 2.8  | 0.9  |
| 20:4 | 1.3  |      | 1.3  |      | 2.2  |
| 20:5 | 4.4  | 5.3  | 6.3  | 6.0  | 9.5  |
| 22:1 |      |      |      |      |      |
| 22:4 | 2.8  |      | 0.6  |      | 1.2  |
| 22:5 |      |      | 0.6  |      | 1.1  |
| 22:6 | 7.8  | 4.1  | 8.3  | 2.9  | 18.9 |
|      | 90.3 | 100.0| 89.3 | 97.3 | 90.0 |

The Artemia enriched with the preferred composition according to the invention has clearly a higher enriched total concentration of DHA in accordance with the invention and is thus particularly suitable for feeding fish larvae such as halibut larvae.

EXAMPLE 7
Use of HUFA- and Phospholipid-Enriched Artemia for Aquacultural Rearing of Halibut Halibut larvae were first fed at 230–250° d. ('° d': multiplication factor of temperature (° C.) and days since hatching.) Circular rearing tanks were used, either 3.5 or 7 m$^3$. Larvae were gradually acclimatized to a rearing temperature of 11° C. and a light intensity of 300–500 lux. The larvae were fed Artemia twice per day, in the morning and in the late afternoon. The Artemia was enriched with an enrichment composition according to the invention 24 h before the morning feed, then stored at 13–15° C. for another 7–8 h for the afternoon feed. Feed rations were adjusted to allow for good digestion of the Artemia. Microalgae (Isocrysis sp.) were added to the rearing water to reduce stress and facilitate maximum ingestion rates. Slight aeration was applied in the center of the tanks to homogenize the water quality and the feed particles. Slight circular current was acquired with the inflow to distribute the larvae. Water exchange was increased from 1.2 times per 24 h in the beginning up to 3.3 times per 24 h in the end. Larval rearing tanks were cleaned daily.

Survival rates of over 80% in one tank from start of feed to end of larval stage were observed (90% excluding "gapers": larvae with jaw deformity), and frequently survival rates between 65 and 75% have been observed. On average about 80% of juveniles showed correct pigmentation, but up to 96% correct pigmentation in one tank were observed. Correct pigmentation is defined as a normal pigmentation color on the ocular side and no pigmentation on the blind side. About 65% of juveniles on average but up to 80% in one tank showed correct eye migration, that is having both eyes on the ocular side. Ongoing experiments indicate that even higher average survival and pigmentation rates are obtainable.

The results show that DHA-enriched prey organisms according to the invention are particularly suitable for the rearing of aquatic species such as halibut in terms of high survival rates and quality.

What is claimed is:

1. A method of producing prey organisms for use in aquaculture, the method comprising cultivating said organisms during at least part of their life cycle in an aqueous medium comprising a feed composition having a docosahexaenoic acid (DHA) content of at least 30 wt % and a ratio of DHA to eicosapentaenoic acid (EPA) which is at least 3:1, the composition comprising a 2–75 wt % of a marine animal phospholipid-rich component comprising at least 25 wt % phospholipids; about 5-about 99 wt % of a further lipid component obtained from fish-based sources; and less than 10 wt % of free fatty acids.

2. A method according to claim 1 wherein the cultivation is carried out until in at least 50% of the cultivated organisms the DHA content of their total lipid content is 12 wt % or higher.

3. A method according to claim 2 wherein the DHA content of the total lipid content of the cultivated organisms is at least 15%.

4. A method according to claim 2 wherein the DHA content of the total lipid content of the cultivated organisms is at least 17.5 wt %.

5. A method according to claim 2 wherein the DHA content of the total lipid content of the cultivated organisms is at least 20 wt %.

6. A method according to claim 1 wherein the organisms to be cultivated are selected from the group consisting of a planktonic species, crustacean species, Rotifera species and Brachiopoda species.

7. A method according to claim 6 wherein the crustacean species is an Artemia species.

8. A method according to claim 7 wherein the Artemia species is cultivated in the aqueous medium at a naupliar, metanaupliar, or adult stage.

9. A method according to claim 6 wherein planktonic species includes a Rotifera species or a Brachiopoda species.

10. A method according to claim 9 wherein the Rotifera species includes *Brachionus Plicatilis, Brachionus rotundiformis,* or *Brachionus rubens.*

11. A method according to claim 6 wherein the crustacean species include Artemia, Copepoda, Daphnia, or Moina species.

12. A method according to claim 1 wherein the phospholipid-rich component comprises at least 50 wt % of phospholipids.

13. A method according to claim 1 wherein the phospholipid-rich component comprises at least 70 wt % of phospholipids.

14. A method according to claim 1 wherein the further lipid component has a content of DHA of at least 30 wt %.

15. A method according to claim 14 wherein the further lipid component has a content of DHA of at least 50 wt %.

16. A method according to claim 1 wherein the amount of the further lipid component is about 50-about 95 wt %.

17. A method according to claim 1 wherein the amount of the phospholipid-rich component is about 5-about 50 wt %.

18. A method according to claim 1 wherein the total content of DHA in the composition is at least 40 wt %.

19. A method according to claim 18 wherein the total content of DHA in the composition is at least 50 wt %.

20. A method according to claim 18 wherein the total content of DHA in the composition is at least 60 wt %.

21. A method according to claim 1 wherein the further lipid component is essentially triglycerides.

22. A method according to claim 21 wherein the essentially triglycerides component is obtained by contacting glycerol and DHA in the presence of a catalyst or an enzyme.

23. A method according to claim 22, wherein the enzyme is a lipase.

24. A method according to claim 22, wherein the enzyme is a lipase produced by *Candida antarctica.*

25. A method according to claim 1 wherein the phospholipid-rich component is obtained by separating it from a marine organism material.

26. A method according to claim 25, wherein the marine organism material includes squid, fish eggs, planktonic biomass, or fish meal.

27. A method according to claim 1 wherein the aqueous medium comprises 0.01 to 5 g/L of a lipid composition.

28. A method according to claim 1 wherein a lipid composition is emulsified in the aqueous medium.

29. A method according to claim 28 wherein said lipid composition is in the form of micellar particles having an average largest dimension of about 1-about 100 μm.

30. A method according to claim 28 wherein said lipid composition is in the form of micellar particles having an average largest dimension of about 1-about 50 μm.

31. A method according to claim 1 wherein the aqueous medium is sea water.

32. A method according to claim 1 wherein the aquaculture is feeding of larval fish.

33. A method according to claim 1 wherein the further lipid component has a content of DHA of at least 40 wt %.

34. A method according to claim 1 wherein the further lipid component consists essentially of glycerides.

35. A method according to claim 1 wherein at least one of the DHA, EPA, or the further lipid component is in the form of a glyceride.

36. A method according to claim 35 wherein the glyceride is produced by contacting at least one of DHA, EPA or the further lipid component, as a free fatty acid, and glycerol in the presence of a suitable chemical catalyst or an enzyme.

37. A method according to claim 35 wherein at least one of the DHA, EPA or the further lipid component is in the form of triglycerides.

38. A method of producing a composition for feeding aquatic organisms in the larval stage, the non-larval stage, or a combination of the larval and non-larval stages, the composition comprising less than 50 wt % water and cultivated organisms selected from the group consisting of a Crustacea species; Rotifera species; Brachiopoda species; and Nematoda species; said cultivated organisms including a content of docosahexaenoic acid of at least 12 wt % of the total lipid content of the organisms, and including a total lipid content of at least 20 wt % on a dry weight basis, the method comprising producing cultivated organisms according to the method of claim 1 and at least partially separating the cultivated organisms from the aqueous medium.

39. A method according to claim 38 comprising the further step of drying the separated cultivated organisms.

40. A method according to claim 38 wherein the Crustacea species include Artemia, Copepoda, Daphnia, or Moina species.

* * * * *